US012619329B2

(12) United States Patent　(10) Patent No.:　US 12,619,329 B2
Park et al.　(45) Date of Patent:　May 5, 2026

(54) ELECTRONIC DEVICE

(71) Applicant: Samsung Display Co., Ltd., Yongin-si (KR)

(72) Inventors: Sanghun Park, Yongin-si (KR); Gwang-Bum Ko, Yongin-si (KR); Byeongkyu Jeon, Yongin-si (KR); Joo-Hyeon Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/898,288

(22) Filed: Sep. 26, 2024

(65) Prior Publication Data

US 2025/0244843 A1　Jul. 31, 2025

(30) Foreign Application Priority Data

Jan. 30, 2024　(KR) ........................ 10-2024-0013894

(51) Int. Cl.
　G06F 3/041　(2006.01)
　G06F 3/044　(2006.01)
(52) U.S. Cl.
　CPC ........ G06F 3/04164 (2019.05); G06F 3/0412 (2013.01); G06F 3/0442 (2019.05); *G06F 2203/04111* (2013.01)
(58) Field of Classification Search
　CPC .. G06F 3/0442; G06F 3/04164; G06F 3/0443; G06F 3/0446; G06F 3/0412; G06F 3/0448; G06F 2203/04111
　See application file for complete search history.

(56) References Cited

U.S. PATENT DOCUMENTS

| | | | | |
|---|---|---|---|---|
| 9,081,453 | B2 * | 7/2015 | Bulea ...................... | G06F 3/041 |
| 9,898,146 | B2 * | 2/2018 | Jang ................... | G06F 3/04166 |
| 10,775,942 | B2 * | 9/2020 | Han ...................... | G06F 3/0443 |
| 10,969,907 | B2 | 4/2021 | Gourevitch et al. | |
| 11,531,438 | B2 | 12/2022 | Smith et al. | |
| 11,567,617 | B2 * | 1/2023 | Lee ........................ | G06F 3/0445 |
| 11,573,663 | B1 * | 2/2023 | Yun ...................... | G06F 1/1652 |
| 11,789,561 | B2 | 10/2023 | Vaze et al. | |
| 11,847,283 | B2 * | 12/2023 | Lee ...................... | H10K 59/873 |
| 11,861,112 | B2 * | 1/2024 | Kim ...................... | G06F 3/0446 |
| 2011/0234523 | A1 * | 9/2011 | Chang .................. | G06F 3/0446 |
| | | | | 345/173 |

(Continued)

*Primary Examiner* — Olga V Merkoulova
(74) *Attorney, Agent, or Firm* — Womble Bond Dickinson (US) LLP

(57)　ABSTRACT

An electronic device includes a display layer, a sensor layer in which an active area is defined, and a sensor driving unit, wherein the active area is defined as a first area and a second area, the sensor layer includes a plurality of first electrodes, each of which includes a plurality of first sub-electrodes and a plurality of second sub-electrodes arranged alternately in the first direction, a plurality of second electrodes, a first line, a second line, a third line connected to one of the plurality of first sub-electrodes and in the first area, and a fourth line connected to one of the plurality of second sub-electrodes and in the second area, and the senor driving unit is configured to compensate for coordinates based on a difference between a first sensing signal sensed in the third line and a second sensing signal sensed in the fourth line.

20 Claims, 11 Drawing Sheets

(56)                    References Cited

U.S. PATENT DOCUMENTS

| 2013/0181943 | A1* | 7/2013 | Bulea | G06F 3/041 |
| | | | | 345/174 |
| 2015/0261348 | A1* | 9/2015 | Jang | G06F 3/04164 |
| | | | | 345/173 |
| 2018/0373359 | A1* | 12/2018 | Han | G06F 3/04164 |
| 2021/0382580 | A1* | 12/2021 | Lee | G06F 3/0443 |
| 2022/0276761 | A1* | 9/2022 | Kim | G06F 3/04166 |
| 2024/0118769 | A1* | 4/2024 | So | G06F 3/0418 |

* cited by examiner

FIG. 9

ELECTRONIC DEVICE

CROSS-REFERENCE TO RELATED APPLICATION

The present application claims priority to and the benefit of Korean Patent Application No 10-2024-0013894, filed on Jan. 30, 2024, in the Korean Intellectual Property Office, the entire disclosure of which is incorporated herein by reference.

BACKGROUND

1. Field

Aspects of some embodiments of the present disclosure described herein relate to an electronic device.

2. Description of the Related Art

Multimedia electronic devices such as televisions, mobile phones, tablet computers, navigation systems, game consoles, and vehicle displays may display images and provide a touch-based input manner that allows a user to relatively easily, intuitively, and conveniently input information or commands in addition to general input manners such as buttons, keyboards, and mice.

The above information disclosed in this Background section is only for enhancement of understanding of the background and therefore the information discussed in this Background section does not necessarily constitute prior art.

SUMMARY

Aspects of some embodiments of the present disclosure described herein relate to an electronic device having relatively improved sensing reliability.

According to some embodiments, an electronic device includes a display layer, a sensor layer on the display layer and in which an active area is defined, and a sensor driving unit that drives the sensor layer, wherein a portion of the active area is defined as a first area, and the other portion of the active area is defined as a second area adjacent to the first area in a first direction, the sensor layer includes a plurality of first electrodes, each of which includes a plurality of first sub-electrodes and a plurality of second sub-electrodes arranged alternately in the first direction. a plurality of second electrodes, each of which extends in a second direction intersecting the first direction, a first line electrically connected to the plurality of first sub-electrodes, a second line electrically connected to the plurality of second sub-electrodes, a third line extending in the second direction, connected to one of the plurality of first sub-electrodes, and in the first area, and a fourth line extending in the second direction, connected to one of the plurality of second sub-electrodes, and in the second area, and the senor driving unit compensates for coordinates based on a difference between a first sensing signal sensed in the third line and a second sensing signal sensed in the fourth line.

According to some embodiments, the third line and the fourth line may be spaced apart from each other in the first direction with at least one of the plurality of first sub-electrodes and/or at least one of the plurality of second sub-electrodes interposed therebetween.

According to some embodiments, the sensor layer may further include a plurality of fifth lines connected to the plurality of second electrodes, respectively.

According to some embodiments, at least a portion of each of the first line and the second line may extends in the first direction and may be in the active area.

According to some embodiments, the plurality of first sub-electrodes and the plurality of second sub-electrodes may be electrically insulated from each other.

According to some embodiments, the first line, the second line, the third line, and the fourth line may be connected to the sensor driving unit.

According to some embodiments, the sensor driving unit may include a differential amplifier, the first line may be electrically connected to a first terminal of the differential amplifier, and the second line may be electrically connected to a second terminal of the differential amplifier.

According to some embodiments, in a plan view, the third line and the fourth line overlap the plurality of second electrodes.

According to some embodiments, the sensor driving unit may include a sensor controlling circuit, a signal generating circuit, and an input detecting circuit, and the signal generating circuit sequentially may provide a driving signal to the plurality of second electrodes.

According to some embodiments, the input detecting circuit may include a plurality of signal receiving unit, each of which includes an amplifier, and the third line and the fourth line may be electrically connected to the plurality of signal receiving units.

According to some embodiments, the first line and the second line may be arranged in the active area.

According to some embodiments, the plurality of first electrodes may extend in the first direction, the plurality of first electrodes may be arranged in the second direction, the plurality of second electrodes may be arranged in the first direction, and the plurality of first electrodes and the plurality of second electrodes may be insulated from and intersect each other.

According to some embodiments, an electronic device includes a display layer, a sensor layer on the display layer, and a sensor driving unit that drives the sensor layer, wherein the sensor layer includes a plurality of first electrodes, each of which includes a plurality of first sub-electrodes and a plurality of second sub-electrodes arranged alternately in a first direction, a plurality of second electrodes, each of which extends in a second direction intersecting the first direction, a first line extending in the first direction and electrically connected to the plurality of first sub-electrodes, a second line extending in the first direction and electrically connected to the plurality of second sub-electrodes. a third line extending in the second direction and connected to one of the plurality of first sub-electrodes, and a fourth line extending in the second direction and connected to one of the plurality of second sub-electrodes, the third line and the fourth line are spaced apart from each other in the first direction with at least one of the plurality of first sub-electrodes and/or at least one of the plurality of second sub-electrodes interposed therebetween, and the senor driving unit compensates for coordinates based on a difference between a first sensing signal sensed in the third line and a second sensing signal sensed in the fourth line.

According to some embodiments, an active area including a first area and a second area adjacent to the first area in the first direction may be defined in the sensor layer, the third line may be in the first area, and the fourth line may be in the second area.

According to some embodiments, the first line and the second line may be arranged in the active area.

According to some embodiments, the sensor layer may further include a plurality of fifth lines connected to the plurality of second electrodes, respectively.

According to some embodiments, at least a portion of each of the first line and the second line may extends in the first direction and may be in the active area.

According to some embodiments, the plurality of first sub-electrodes and the plurality of second sub-electrodes may be electrically insulated from each other.

According to some embodiments, in a plan view, the third line and the fourth line overlap the plurality of second electrodes.

According to some embodiments, the sensor driving unit may include a sensor controlling circuit, a signal generating circuit, and an input detecting circuit, the input detecting circuit may include a plurality of signal receiving unit, each of which includes an amplifier, and the third line and the fourth line may be electrically connected to the plurality of signal receiving units.

BRIEF DESCRIPTION OF THE DRAWINGS

The above and other aspects and features of the present disclosure will become apparent by describing in more detail aspects of some embodiments thereof with reference to the accompanying drawings.

FIG. 9 is an enlarged plan view illustrating area AA of FIG. 7 according to some embodiments of the present disclosure.

DETAILED DESCRIPTION

Figure 1:
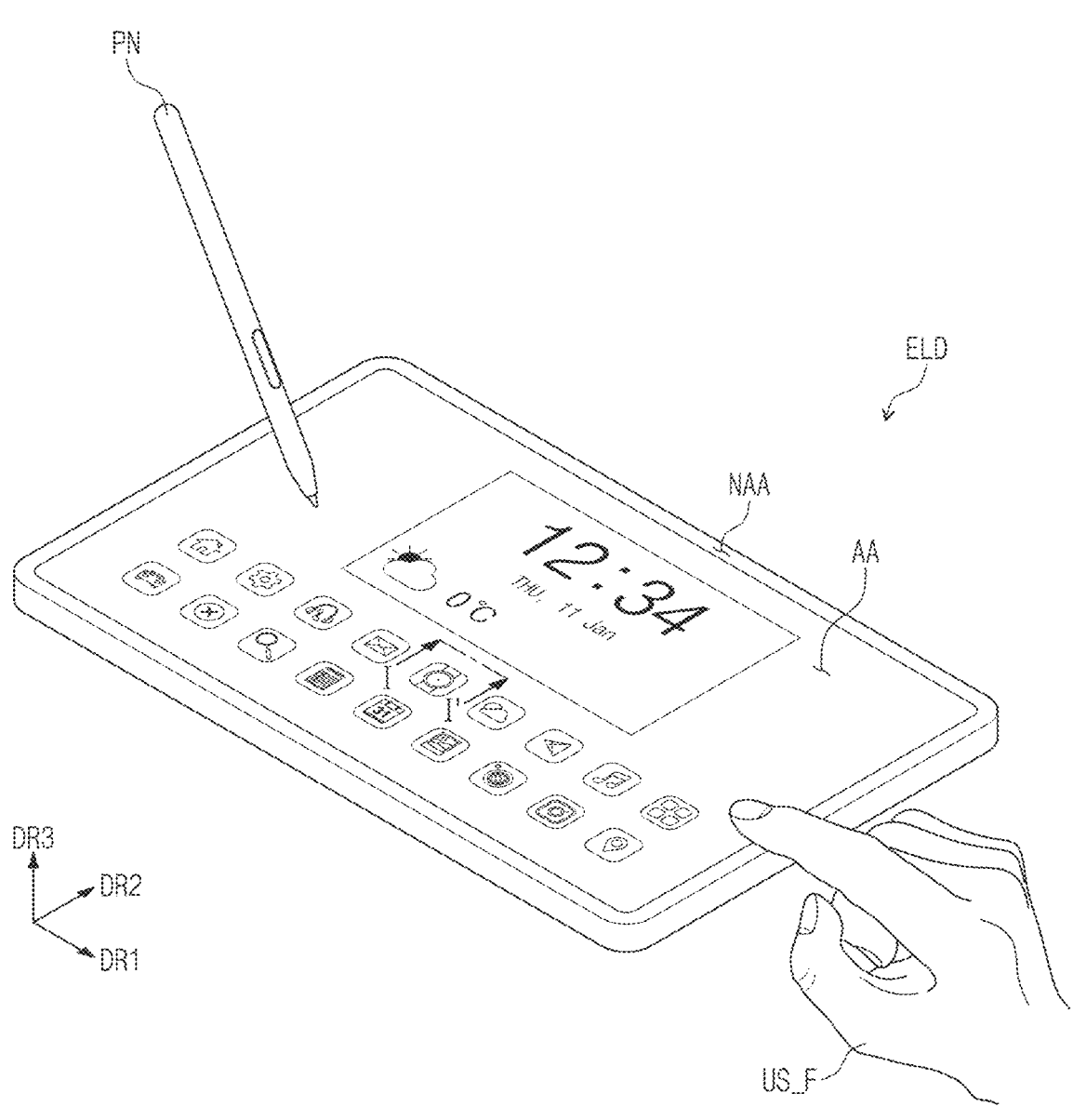
FIG. 1 is a perspective view of an electronic device according to some embodiments of the present disclosure.

In the present specification, the expression that a first component (or area, layer, part, portion, etc.) is "located on", "connected with" or "coupled to" a second component means that the first component is directly located on/connected with/coupled to the second component or means that a third component is interposed therebetween.

The same reference numerals refer to the same components. Further, in the drawings, the thickness, the ratio, and the dimension of components are exaggerated for effective description of technical contents. The expression "and/or" includes one or more combinations which associated components are capable of defining.

Although the terms "first", "second", etc. may be used to describe various components, the components should not be limited by the terms. The terms are only used to distinguish one component from another component. For example, without departing from the right scope of the present disclosure, a first component may be referred to as a second component, and similarly, the second component may be also referred to as the first component. Singular expressions include plural expressions unless clearly otherwise indicated in the context.

Also, the terms "under", "below", "on", "above", etc. are used to describe the correlation of components illustrated in drawings. The terms that are relative in concept are described based on a direction illustrated in drawings.

It will be understood that the terms "include", "comprise", "have", etc. specify the presence of features, numbers, steps, operations, elements, or components, described in the specification, or a combination thereof, and do not exclude in advance the presence or additional possibility of one or more other features, numbers, steps, operations, elements, or components or a combination thereof.

Unless otherwise defined, all terms (including technical terms and scientific terms) used in the specification have the same meaning as commonly understood by those skilled in the art to which the present disclosure belongs. Further, terms such as terms defined in the dictionaries commonly used should be interpreted as having a meaning consistent with the meaning in the context of the related technology and should not be interpreted in overly ideal or overly formal meanings unless explicitly defined herein.

Hereinafter, aspects of some embodiments of the present disclosure will be described with reference to the accompanying drawings.

FIG. 1 is a perspective view of an electronic device according to some embodiments of the present disclosure.

Referring to FIG. 1, an electronic device ELD may be a device that is activated according to an electric signal. For example, the electronic device ELD may be a mobile phone, a foldable mobile phone, a laptop computer, a television, a tablet, a vehicle navigation system, a game console, or a wearable device, but embodiments according to the present disclosure are not limited thereto. As an example for purposes of description, FIG. 1 illustratively illustrates that the electronic device ELD is a mobile phone.

The electronic device ELD may display images and may sense inputs applied from an external unit. The external input may be input of a user. The input of the user may include various types of external input such as a portion US_F of a body of the user, a pen PN, light, heat or a pressure. The input of the user may include all inputs that may change a capacitance of a sensor layer.

An active area AA and a peripheral area NAA may be defined in the electronic device ELD. The electronic device ELD may display images at the active area AA. The active area AA may include a plane defined by a first direction DR1 and a second direction DR2. The peripheral area NAA may surround a periphery (or outside a footprint) of the active area AA. According to some embodiments of the present disclosure, the peripheral area NAA may be omitted.

A thickness direction of the electronic device ELD may be parallel to a third direction DR3 intersecting the first direction DR1 and the second direction DR2. Thus, front surfaces (or upper surfaces) and rear surfaces (or lower surfaces) of members constituting the electronic device ELD may be defined based on the third direction DR3.

FIG. 1 illustratively illustrates a bar-type electronic device ELD, but embodiments according to the present disclosure are not limited thereto. For example, the following descriptions may be applied to various electronic devices ELD such as a foldable electronic device, a rollable electronic device, or a slidable electronic device.

Figure 2:
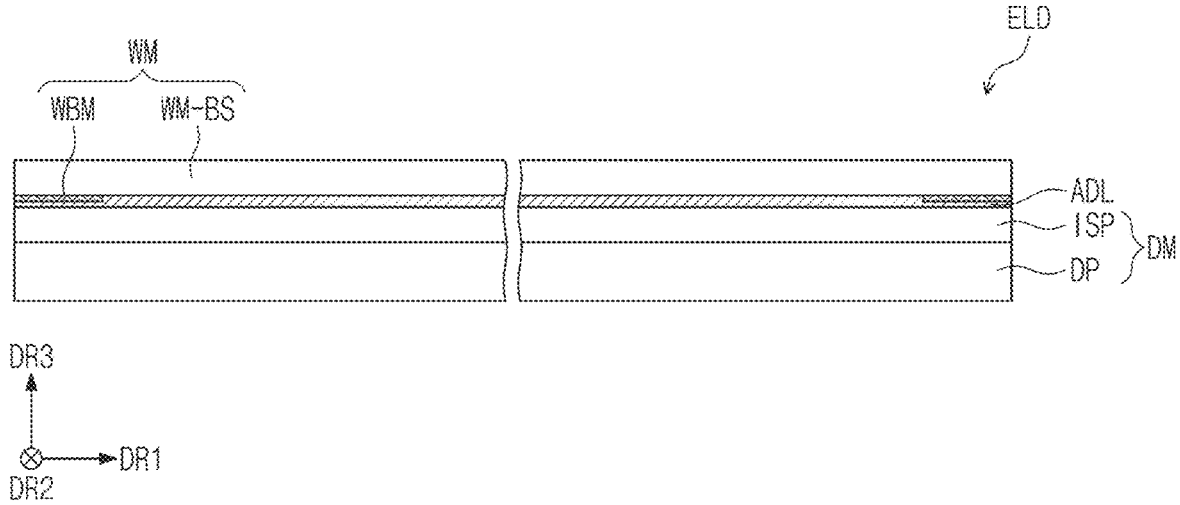
FIG. 2 is a cross-sectional view of the electronic device according to some embodiments of the present disclosure.

FIG. 2 is a cross-sectional view of the electronic device according to some embodiments of the present disclosure.

Referring to FIG. 2, the electronic device ELD may include a display module DM and a window WM. The display module DM may display images and detect external inputs. The display module DM may include a display layer DP and a sensor layer ISP.

A display area and a non-display area corresponding to the active area AA (see FIG. 1) and the peripheral area NAA (see FIG. 1) of the electronic device ELD may be defined in the display layer DP.

The display layer DP according to some embodiments of the present disclosure may be a light emitting display layer, but embodiments according to the present disclosure are not limited thereto. For example, the display layer DP may be an organic light emitting display layer, a quantum dot light emitting display layer, a micro light emitting diode (LED) display layer, or a nano LED display layer. A light emitting layer of the organic light emitting display layer may include an organic light emitting material. A light emitting layer of the quantum dot light emitting display layer may include a quantum dot, a quantum rod and the like. A light emitting layer of the micro LED display layer may include a micro LED. A light emitting layer of the nano LED display layer may include a nano LED.

The sensor layer ISP may be directly located on the display layer DP. According to some embodiments of the present disclosure, the sensor layer ISP may be formed on the display layer DP through a continuous process. That is, when the sensor layer ISP is directly located on the display layer DP, an internal adhesive layer IAL is not located between the sensor layer ISP and the display layer DP.

The electronic device ELD may further include an optical member located on the display module DM. The optical member may be a reflection preventing layer that may reduce external light reflectance. The optical member may include a polarizer and a phase retarder. The polarizer and the phase retarder may be of a stretched type or a coated type. An optical axis of the coated type optical film is defined according to a stretching direction of a functional film. The coated type optical film may include liquid crystal molecules arranged on a base film.

According to some embodiments of the present disclosure, the optical member may be omitted. In this case, the display module DM may further include a color filter and a black matrix that replace the optical member.

The window WM provides an outer surface of the electronic device ELD. The window WM may include a base substrate and may further include functional layers such as a reflection preventing layer and a fingerprint preventing layer.

According to some embodiments, the display module DM may further include at least one adhesive layer ADL. The adhesive layer ADL may couple components of the display module DM. The adhesive layer ADL may be an optical transparent adhesive layer or a pressure-sensitive adhesive layer.

The window WM may include a light shielding pattern WBM for defining the peripheral area NAA (see FIG. 1). The light shielding pattern WBM may be a colored organic layer and may be formed on one surface of a window base layer WM-BS using, for example, a coating method.

Figure 3:
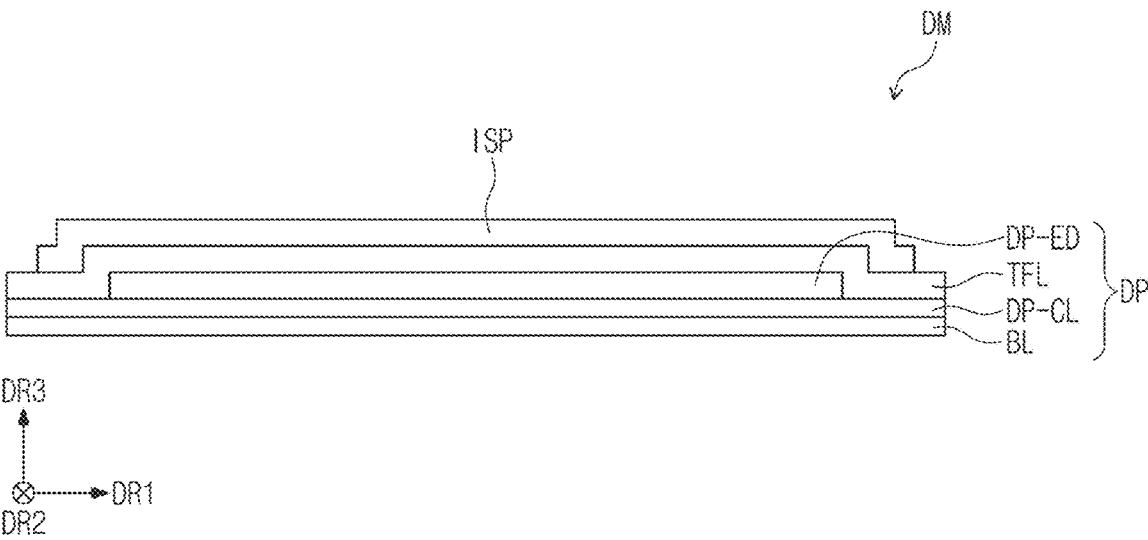
FIG. 3 is a cross-sectional view of a display module according to some embodiments of the present disclosure.

FIG. 3 is a cross-sectional view of a display module according to some embodiments of the present disclosure.

Referring to FIG. 3, the display module DM may include the display layer DP and the sensor layer ISP.

The display layer DP may include a base layer BL, a circuit layer DP-CL, a light emitting element layer DP-ED, and an encapsulation layer TFL.

The base layer BL may be a member that provides a base surface on which the circuit layer DP-CL is located. The base layer BL may have a multi-layer structure or a single-layer structure. The base layer BL may be a glass substrate, a metal substrate, a silicon substrate, a polymer substrate or the like, but embodiments according to the present disclosure are not limited thereto.

The circuit layer DP-CL may be located on the base layer BL. The circuit layer DP-CL may include an insulation layer, a semiconductor pattern, a conductive pattern, a signal line, and the like. The insulating layer, a semiconductor layer, and a conductive layer may be formed on the base layer BL in a manner such as coating and deposition, and the insulating layer, the semiconductor layer, and the conductive layer may be selectively patterned through a plurality of photolithography processes.

The light emitting element layer DP-ED may be located on the circuit layer DP-CL. The light emitting element layer DP-ED may include a light emitting element. For example, the light emitting element layer DP-ED may include an organic light emitting material, an inorganic light emitting material, an organic-inorganic light emitting material, a quantum dot, a quantum rod, a micro-LED, or a nano-LED.

The encapsulation layer TFL may be located on the light emitting element layer DP-ED. The encapsulation layer TFL may protect the light emitting element layer DP-ED from foreign substances or contaminants such as moisture, oxygen, and dust particles.

The sensor layer ISP may be located on the display layer DP. The sensor layer ISP may sense an external input applied from an external unit. The sensor layer ISP may be an integrated sensor formed continuously during a process of manufacturing the display layer DP or the sensor layer ISP may be an external sensor attached to the display layer DP.

Figure 4:
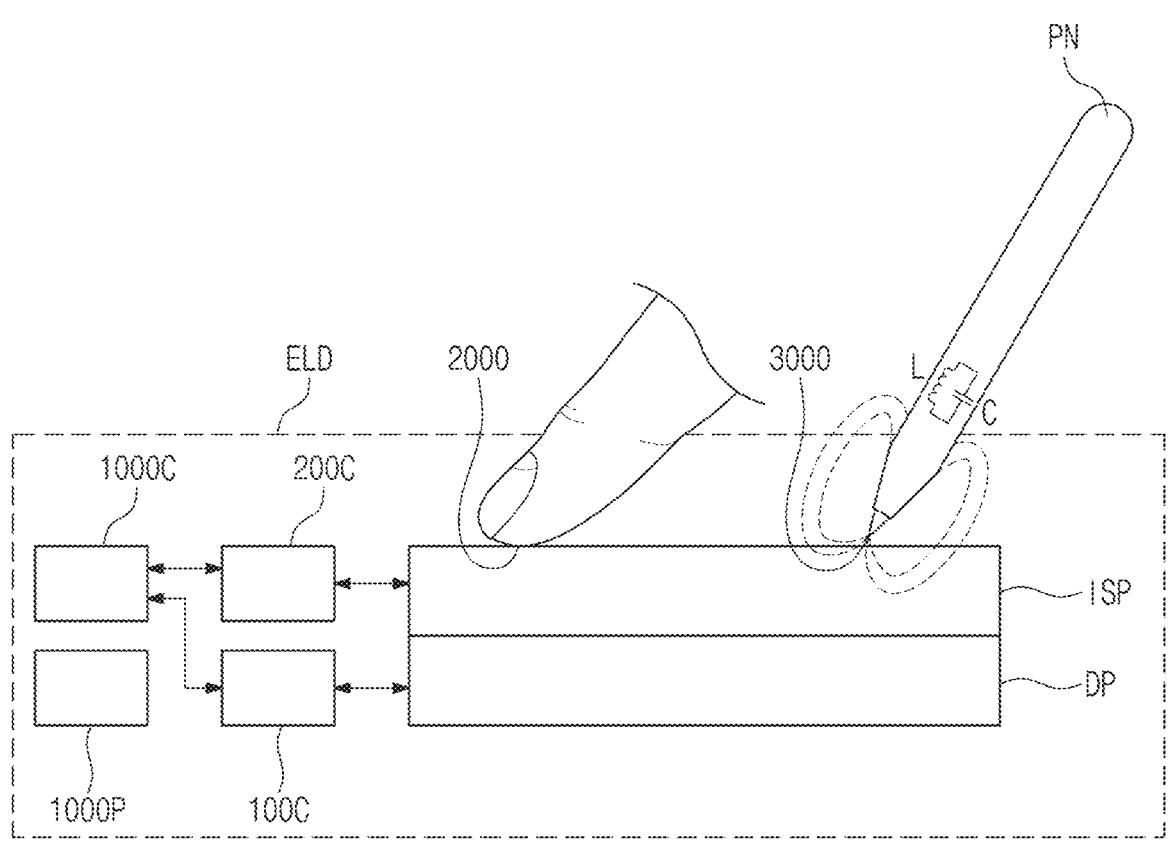
FIG. 4 is a view for describing an operation of the electronic device according to some embodiments of the present disclosure.

FIG. 4 is a view for describing an operation of the electronic device according to some embodiments of the present disclosure.

Referring to FIG. 4, the electronic device ELD may include the display layer DP, the sensor layer ISP, a display driving unit 100C, a sensor driving unit 200C, a main driving unit 1000C, and a power circuit 1000P.

The sensor layer ISP may sense first input 2000 and second input 3000 applied from an external unit. The first input 2000 and the second input 3000 may be input means that may provide a change in a capacitance of the sensor layer ISP or may be input means that may cause an induced current in the sensor layer ISP. For example, the first input 2000 may be a passive type input mechanism such as the body of the user. The second input 3000 may be an input by the pen PN or an input by a radio frequency integrated circuit (RFIC) tag. For example, the pen PN may be a passive type pan or an active type pen.

According to some embodiments of the present disclosure, the pen PN may be a device that generates a magnetic field having a resonant frequency (e.g., a set or predetermined resonant frequency). The pen PN may be configured to transmit an output signal based on an electromagnetic resonance method. The pen PN may be referred to as an input device, an input pen, a magnetic pen, a stylus pen, or an electromagnetic resonance pen.

The pen PN may include an RLC resonant circuit, and the RLC resonant circuit may include an inductor "L" and a capacitor "C." According to some embodiments of the present disclosure, the RLC resonant circuit may be a variable resonant circuit having a variable resonant frequency. In this case, the inductor "L" may be a variable inductor and/or the capacitor "C" may be a variable capacitor, but embodiments according to the present disclosure are not limited thereto.

The inductor "L" generates a current by a magnetic field formed in the sensor layer ISP. However, embodiments according to the present disclosure are not limited thereto. For example, when the pen PN operates as an active type, the pen PN may generate a current even when the pen PN does not receive a magnetic field from an external unit. The generated current is transmitted to the capacitor "C." The capacitor "C" charges a current input from the inductor "L" and discharges the charged current to the inductor "L." Thereafter, the inductor "L" may emit a magnetic field having a resonant frequency. The induced current may flow in the sensor layer ISP by the magnetic field emitted by the pen PN, and the induced current as a reception signal (or a sensing signal) may be transmitted to the sensor driving unit 200C.

The main driving unit 1000C may control the overall operation of the electronic device ELD. For example, the main driving unit 1000C may control operations of the display driving unit 100C and the sensor driving unit 200C. The main driving unit 1000C may include at least one microprocessor and may further include a graphic controller. The main driving unit 1000C may be referred to as an application processor, a central processing unit, or a main processor.

The display driving unit 100C may drive the display layer DP. The display driving unit 100C may receive image data and a control signal from the main driving unit 1000C. The control signal may include various signals. For example, the control signal may include an input vertical synchronization signal, an input horizontal synchronization signal, a main clock, a data enable signal, and the like.

The sensor driving unit 200C may drive the sensor layer ISP. The sensor driving unit 200C may receive the control signal from the main driving unit 1000C. The control signal may include a clock signal of the sensor driving unit 200C. Further, the control signal may further include a mode determination signal that determines driving modes of the sensor driving unit 200C and the sensor layer ISP.

The sensor driving unit 200C may be implemented as an integrated circuit (IC) and electrically connected to the sensor layer ISP. For example, the sensor driving unit 200C may be directly mounted on an area (e.g., a set or predetermined area) of the display layer DP or mounted on a separate printed circuit board using a chip on film (COF) method and electrically connected to the sensor layer ISP.

The sensor driving unit 200C and the sensor layer ISP may selectively operate in a first mode or a second mode. For example, the first mode may be a mode for sensing a touch input, for example, the first input 2000. The second mode may be a mode for sensing the input by the pen PN, for example, the second input 3000. The first mode may be referred to as a touch sensing mode, and the second mode may be referred to as a pen sensing mode.

Switching between the first mode and the second mode may be performed in various manners. For example, the sensor driving unit 200C and the sensor layer ISP may be driven in the first mode and the second mode in a time division manner and may sense the first input 2000 and the second input 3000. Alternatively, the switching between the first mode and the second mode may be generated by selection by the user or by a specific action of the user, any one of the first mode and the second mode may be activated or deactivated by activating or deactivating a specific application, or a current mode may be switched from one to the other one of the first mode and the second mode. Alternatively, while the sensor driving unit 200C and the sensor layer ISP are operating alternately in the first mode and the second mode, when the first input 2000 is sensed, the first mode is maintained or when the second input 3000 is sensed, the second mode is maintained.

The sensor driving unit 200C may calculate coordinate information of input based on a signal received from the sensor layer ISP and provide a coordinate signal having the coordinate information to the main driving unit 1000C. The main driving unit 1000C executes an operation corresponding to the input of the user based on the coordinate signal. For example, the main driving unit 1000C may operate the display driving unit 100C so that a new application image is displayed on the display layer DP.

The power circuit 1000P may include a power management integrated circuit (PMIC). The power circuit 1000P may generate a plurality of driving voltages for driving the display layer DP, the sensor layer ISP, the display driving unit 100C, and the sensor driving unit 200C. For example, the plurality of driving voltages may include a first driving voltage (e.g., an ELVSS voltage), a second driving voltage (e.g., an ELVDD voltage), an initialization voltage or the like, but embodiments according to the present disclosure are not limited to the above example.

Figure 5:
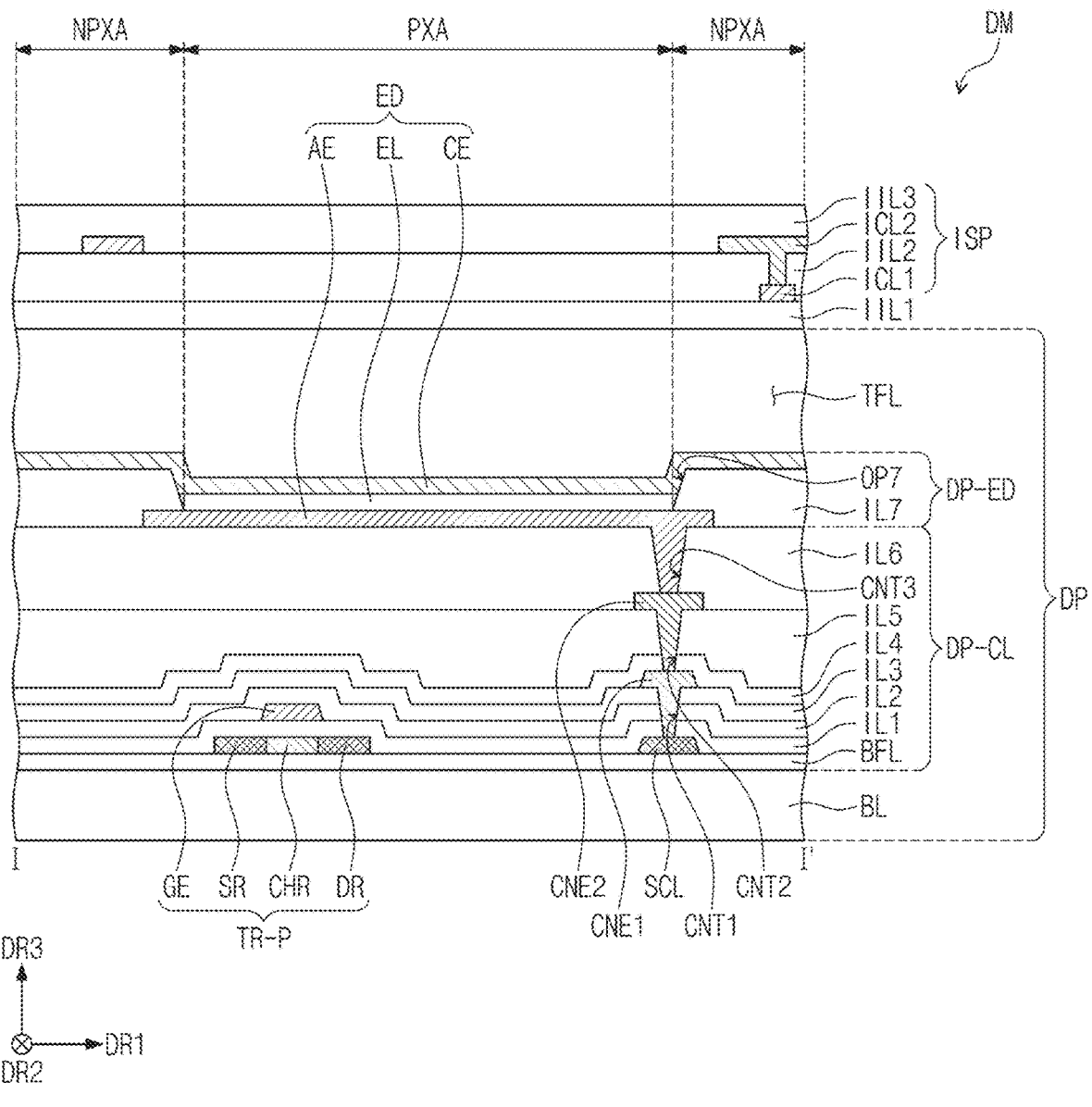
FIG. 5 is a cross-sectional view of the display module along line I-I' of FIG. 1 according to some embodiments of the present disclosure.

FIG. 5 is a cross-sectional view of the display module along the line I-I' of FIG. 1 according to some embodiments of the present disclosure. In the description of FIG. 5, the components described through FIG. 3 are designated by the same reference numerals, and some repetitive description thereof may be omitted.

Referring to FIG. 5, the base layer BL may provide a base surface on which the circuit layer DP-CL is located. The circuit layer DP-CL may be located on the base layer BL. The circuit layer DP-CL may include an insulation layer, a semiconductor pattern, a conductive pattern, a signal line, and the like. The insulating layer, the semiconductor layer, and the conductive layer may be formed on the base layer BL in a manner such as coating and deposition, and then the insulating layer, the semiconductor layer, and the conductive layer may be selectively patterned through a plurality of photolithography processes. Thereafter, the semiconductor pattern, the conductive pattern, and the signal line included in the circuit layer DP-CL may be formed.

At least one inorganic layer is formed on an upper surface of the base layer BL. According to some embodiments, it is illustrated that the display layer DP includes a buffer layer BFL. The buffer layer BFL may relatively improve a coupling force between the base layer BL and the semiconductor pattern. The buffer layer BFL may include a silicon oxide layer and a silicon nitride layer, and the silicon oxide layer and the silicon nitride layer may be alternately laminated.

The semiconductor pattern may be located on the buffer layer BFL. The semiconductor pattern may include polysilicon. However, embodiments according to the present disclosure are not limited thereto, and the semiconductor pattern may include amorphous silicon or metal oxide.

FIG. 5 merely illustrates a portion of the semiconductor pattern, and the semiconductor pattern may be further located in another area. The semiconductor pattern may be located in a specific rule across pixels. The semiconductor pattern may have a different electrical property depending on whether or not the semiconductor pattern is doped. The semiconductor pattern may include a first area having higher conductivity and a second area having lower conductivity. The first area may be doped with an N-type dopant or a P-type dopant. A P-type transistor includes a doped area doped with the P-type dopant. The second area may be a non-doped area or may be doped at a concentration lower than that of the first area.

A conductivity of the first area is greater than a conductivity of the second area, and the first area substantially serves as an electrode or a signal line. The second area may substantially correspond to an active area (or a channel area) of a pixel transistor TR-P. In other words, a portion of the semiconductor pattern may be the active area of the transistor, and the other portion thereof may be a source area or a drain area of the transistor.

Each of pixels may have an equivalent circuit including seven transistors, one capacitor, and a light emitting element, and the equivalent circuit of the pixel may be modified into various forms. FIG. 5 illustratively illustrates one pixel transistor TR-P and one light emitting element ED included in the pixel.

A source area SR, a channel area CHR, and a drain area DR of the pixel transistor TR-P may be formed from the semiconductor pattern. The source area SR and the drain area DR may extend from the channel area CHR in opposite directions on a cross section. FIG. 4 illustrates a portion of a signal transmitting area SCL formed in the first area of the semiconductor pattern. According to some embodiments, the signal transmitting area SCL may be electrically connected to the pixel transistor TR-P on a plane.

A first insulating layer IL1 may be located on the buffer layer BFL. The first insulating layer IL1 may commonly overlap the plurality of pixels and cover the semiconductor pattern. The first insulating layer IL1 may be an inorganic layer and/or an organic layer and may have a single-layer structure or a multi-layer structure. The first insulating layer IL1 may include at least one of an aluminum oxide, a titanium oxide, a silicon oxide, a silicon nitride, a silicon oxy nitride, a zirconium oxide, or a hafnium oxide. According to some embodiments, the first insulating layer IL1 may be a single-layered silicon oxide layer. An insulating layer of the circuit layer DP-CL, which will be described below, as well as the first insulating layer IL1 may be an inorganic layer and/or an organic layer and may have a single-layer structure or a multi-layer structure. The inorganic layer may include at least one of the above-described materials, but embodiments according to the present disclosure are not limited thereto.

A gate GE of the pixel transistor TR-P is located on the first insulating layer IL1. The gate GE may be a portion of a metal pattern. The gate GE overlaps the channel area CHR. The gate GE may function as a mask in a process of doping the semiconductor pattern.

A second insulating layer IL2 may be located on the first insulating layer IL1 and cover the gate GE. The second insulating layer IL2 may commonly overlap the pixels. The second insulating layer IL2 may be an inorganic layer and/or an organic layer and may have a single-layer structure or a multi-layer structure. According to some embodiments, the second insulating layer IL2 may be a single-layered silicon oxide layer.

A third insulating layer IL3 may be located on the second insulating layer IL2, and according to some embodiments, the third insulating layer IL3 may be a single-layer silicon oxide layer. A first connection electrode CNE1 may be located on the third insulating layer IL3. The first connection electrode CNE1 may be connected to the signal transmitting area SCL through a contact hole CNT1 passing through the first insulating layer IL1, the second insulating layer IL2, and the third insulating layer IL3.

A fourth insulating layer IL4 may be located on the third insulating layer IL3. The fourth insulating layer IL4 may be a single-layer silicon oxide layer. A fifth insulating layer IL5 may be located on the fourth insulating layer IL4. The fifth insulating layer IL5 may be an organic layer. Meanwhile, the fourth insulating layer IL4 may be omitted, and the fifth insulating layer IL5 may be located on the third insulating layer IL3.

A second connection electrode CNE2 may be located on the fifth insulating layer IL5. The second connection electrode CNE2 may be connected to the first connection electrode CNE1 through a contact hole CNT2 passing through the fourth insulating layer IL4 and the fifth insulating layer IL5.

A sixth insulating layer IL6 may be located on the fifth insulating layer IL5 and cover the second connection electrode CNE2. The sixth insulating layer IL6 may be an organic layer. The light emitting element layer DP-ED may be located on the circuit layer DP-CL. The light emitting element layer DP-ED may include the light emitting element ED. The light emitting element ED may include a first electrode AE, a light emitting layer EL, and a second electrode CE. For example, the light emitting layer EL may include an organic light emitting material, a quantum dot, a quantum rod, a micro LED, or a nano LED.

The first electrode AE may be located on the sixth insulating layer IL6. The first electrode AE may be connected to the second connection electrode CNE2 through a contact hole CNT3 passing through the sixth insulating layer IL6.

A pixel defining film IL7 may be located on the sixth insulating layer IL6 and cover a portion of the first electrode AE. An opening OP7 is defined in the pixel defining film IL7. At least a portion of the first electrode AE is exposed through the opening OP7 of the pixel defining film IL7. According to some embodiments, a light emitting area PXA is defined to correspond to a partial area of the first electrode AE, which is exposed by the opening OP7. A non-light emitting area NPXA may surround the light emitting area PXA.

The light emitting layer EL may be located on the first electrode AE. The light emitting layer EL may be arranged to correspond to the opening OP7. That is, the light emitting layers EL may be formed separately from the respective pixels. When the light emitting layers EL are formed separately from the respective pixels, each of the light emitting layers EL may emit a light having at least one of a blue color, a red color, or a green color. However, embodiments according to the present disclosure are not limited thereto, and the light emitting layers EL may be connected to the pixels and may be provided commonly. In this case, the light emitting layer EL may also provide a blue light or a white light.

The second electrode CE may be located on the light emitting layer EL. The second electrode CE may have an integral shape and may be arranged in the plurality of pixels in common. A common voltage may be provided to the second electrode CE and the second electrode CE may be referred to as a common electrode.

According to some embodiments, a hole control layer may be located between the first electrode AE and the light emitting layer EL. The hole control layer may be commonly located in the light emitting area PXA and the non-light emitting area NPXA. The hole control layer may include a hole transport layer and may further include a hole injection layer. An electron control layer may be located between the light emitting layer EL and the second electrode CE. The electron control layer may include an electron transport layer and may further include an electron injection layer. The hole control layer and the electron control layer may be commonly formed in the pixels using an open mask.

The sensor layer ISP may be directly formed on an upper surface of the encapsulation layer TFL through a continuous process. The sensor layer ISP may include a first sensor insulating layer IIL1, a first sensor conductive layer ICL1, a second sensor insulating layer IIL2, a second sensor conductive layer ICL2, and a third sensor insulating layer IIL3. In the specification, the first sensor insulating layer IIL1 may be referred to as a "base insulating layer."

Each of the first sensor conductive layer ICL1 and the second sensor conductive layer ICL2 may include a plurality of patterns having a single-layer structure or having a multi-layer structure in which layers are laminated in the third direction DR3. The conductive layer having the single-layer structure may include a metal layer or a transparent conductive layer. The metal layer may include molybdenum, silver, titanium, copper, aluminum, or alloys thereof. The transparent conductive layer may include a transparent conductive oxide such as an indium tin oxide (ITO), an indium a zinc oxide (IZO), a zinc oxide (ZnO), an indium zinc tin oxide (IZTO). In addition, the transparent conductive layer may include a conductive polymer such as poly(3,4-ethylenedioxythiophene) (PEDOT), metal nanowire, graphene, or the like.

The conductive layer having a multi-layer structure may include metal layers. The metal layers may have, for example, a three-layer structure of titanium/aluminum/titanium. The conductive layer having the multi-layer structure may include at least one metal layer and at least one transparent conductive layer.

The second sensor insulating layer IIL2 covers the first sensor conductive layer ICL1, and the third sensor insulating layer IIL3 covers the second sensor conductive layer ICL2. It is illustrated that the first sensor insulating layer IIL1 to the third sensor insulating layer IIL3 have the single-layer structures, but embodiments according to the present disclosure are not limited thereto.

At least one of the first sensor insulating layer IIL1 or the second sensor insulating layer IIL2 may include an inorganic layer. The inorganic film may include at least one of an aluminum oxide, a titanium oxide, a silicon oxide, a silicon nitride, a silicon oxy nitride, a zirconium oxide, or a hafnium oxide.

At least one of the second sensor insulating layer IIL2 or the third sensor insulating layer IIL3 may include an organic layer. The organic film may include at least one of an acryl-based resin, a methacrylate-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

Figure 6:
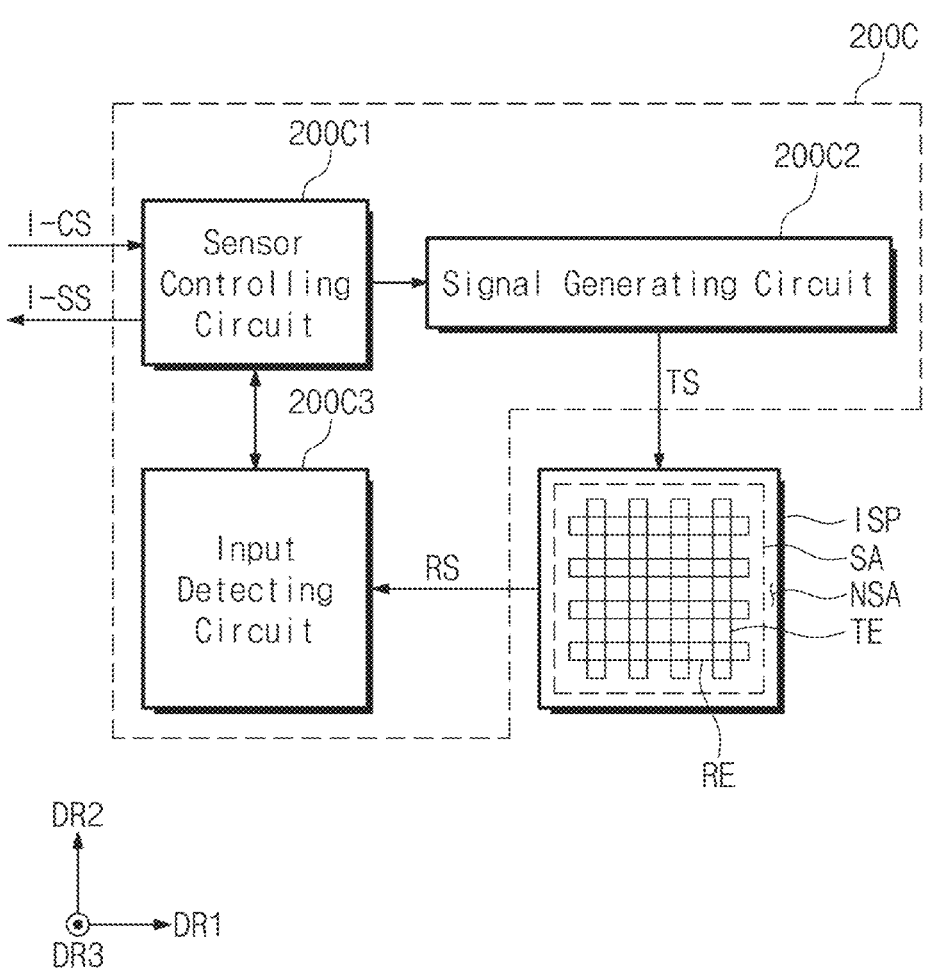
FIG. 6 is a block diagram of a sensor layer and a sensor driving unit according to some embodiments of the present disclosure.

FIG. 6 is a block diagram of a sensor layer and a sensor driving unit according to some embodiments of the present disclosure.

Referring to FIG. 6, an active area SA and a peripheral area NSA adjacent to the active area SA may be defined in the sensor layer ISP. The active area SA and the peripheral area NSA may correspond to the active area AA (see FIG. 1) and the peripheral area NAA (see FIG. 1) of the electronic device ELD (see FIG. 1), respectively. The active area SA may be an area that is activated according to an electric signal. For example, the active area SA may be an area that senses an input.

The sensor layer ISP may include a plurality of first electrodes RE and a plurality of second electrodes TE.

The plurality of first electrodes RE may be arranged to be spaced apart from each other in the second direction DR2. The plurality of first electrodes RE may extend in the first direction DR1.

The plurality of second electrodes TE may be arranged to be spaced apart from each other in the first direction DR1. The plurality of second electrodes TE may extend in the second direction DR2.

The sensor driving unit 200C may be electrically connected to the sensor layer ISP. The sensor driving unit 200C may control the sensor layer ISP. The sensor driving unit 200C may receive a control signal I-CS from the main driving unit 1000C (see FIG. 4) and provide a coordinate signal I-SS to the main driving unit 1000C (see FIG. 4).

The sensor driving unit 200C may include a sensor controlling circuit 200C1, a signal generating circuit 200C2, and an input detecting circuit 200C3. The sensor controlling circuit 200C1, the signal generating circuit 200C2, and the input detecting circuit 200C3 may be implemented in a single chip or some and the others of the sensor controlling circuit 200C1, the signal generating circuit 200C2, and the input detecting circuit 200C3 may be implemented within different chips.

The sensor controlling circuit 200C1 may control a mode of the sensor layer ISP. The sensor controlling circuit 200C1 may control an operation of the signal generating circuit 200C2 and calculate coordinates of an external input from a signal received from the input detecting circuit 200C3.

The signal generating circuit 200C2 may output an output signal corresponding to an operation mode to the sensor layer ISP. The signal generating circuit 200C2 may provide a first touch signal TS (or a driving signal), which is referred to as a TX signal, to the sensor layer ISP. The first touch signal TS may be sequentially provided to the plurality of second electrodes TE.

The input detecting circuit 200C3 may convert an analog signal, which is a second touch signal RS (or a detecting signal) referred to as an RX signal received from the sensor layer ISP, into a digital signal. The input detecting circuit 200C3 may amplify and then filter the received analog signal. Thereafter, the input detecting circuit 200C3 may convert the filtered signal into the digital signal. The input detecting circuit 200C3 may reduce or remove noise of the received second touch signal RS. This will be described below.

Figure 7:
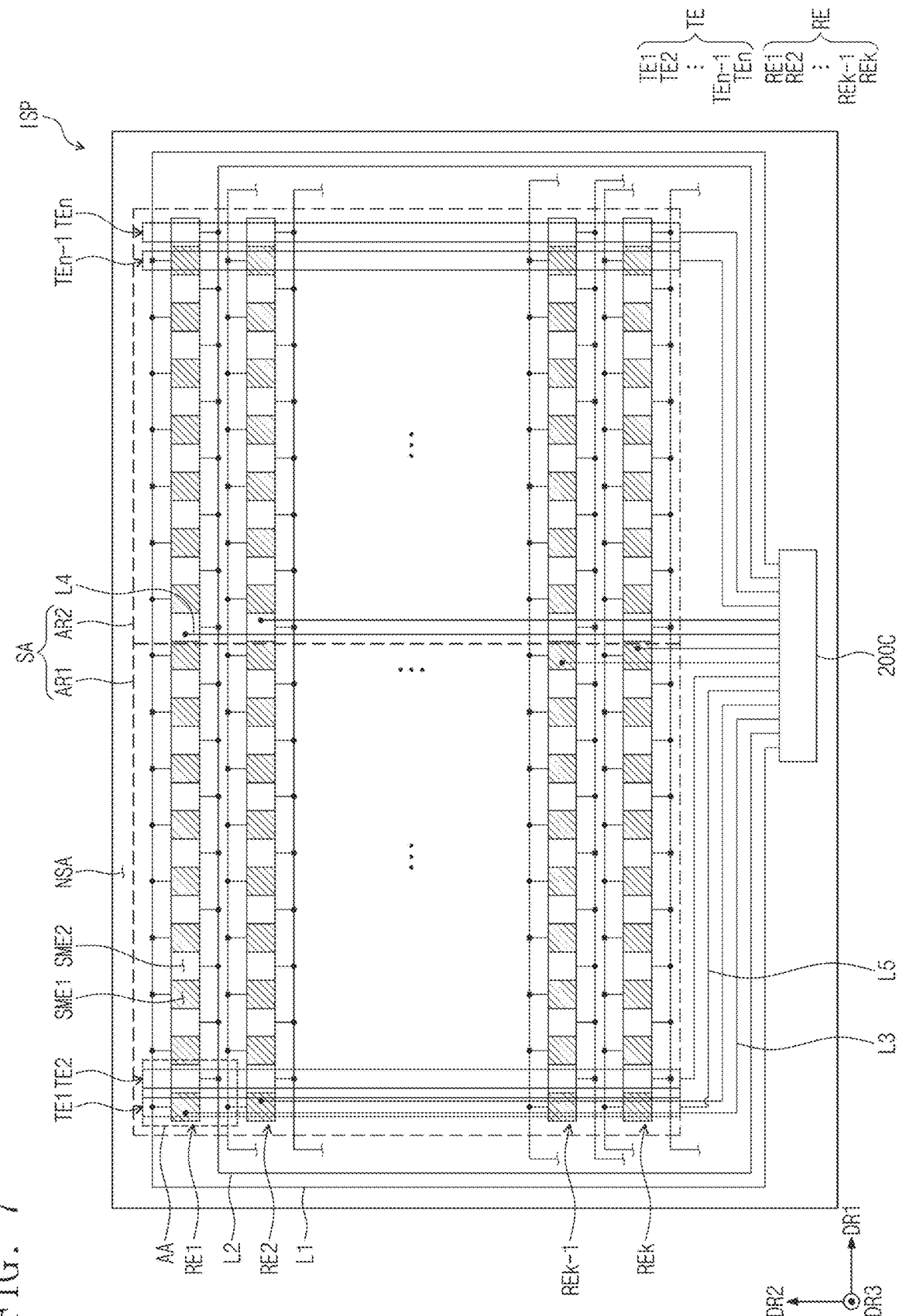
FIG. 7 is a plan view of the sensor layer and the sensor driving unit according to some embodiments of the present disclosure.

FIG. 7 is a plan view of the sensor layer and the sensor driving unit according to some embodiments of the present disclosure. In the description of FIG. 7, the components described through FIG. 6 are designated by the same reference numerals, and some repetitive description thereof may be omitted.

Referring to FIG. 7, an active area SA and a peripheral area NSA may be defined in the sensor layer ISP. A portion of the active area may be defined as a first area AR1, and the other portion of the active area SA may be defined as a second area AR2. That is, when viewed on a plane (e.g., in a plan view), the first area AR1 and the second area AR2 may not overlap each other. The second area AR2 may be adjacent to the first area AR1 in the first direction DR1.

The sensor layer ISP may include the plurality of first electrodes RE, the plurality of second electrodes TE, a first line L1, a second line L2, a third line L3, a fourth line L4, and a fifth line L5.

The plurality of first electrodes RE and the plurality of second electrodes TE may be electrically insulated from each other and may intersect each other.

Each of the plurality of first electrodes RE may include a plurality of first sub-electrodes SME1 and a plurality of second sub-electrodes SME2. The plurality of first sub-electrodes SME1 and the plurality of second sub-electrodes SME2 may be alternately arranged in the first direction DR1. The plurality of first sub-electrodes SME1 and the plurality of second sub-electrodes SME2 may be electrically insulated from each other.

According to the present disclosure, a first channel including the plurality of first sub-electrodes SME1 and a second channel including the plurality of second sub-electrodes SME2 may be defined in each of the plurality of first electrodes RE. The number of channels of the plurality of first electrodes RE that receive the second touch signal RS (see FIG. 6) may increase, and accordingly, noise may be reduced by half. Accordingly, the electronic device ELD (see FIG. 1) having relatively improved sensing reliability may be provided.

The plurality of first electrodes RE may include a first row first electrode RE1, a second row first electrode RE2, a $(k-1)^{th}$ row first electrode REk−1, and a $k^{th}$ row first electrode REk. In this case, k may be a natural number greater than 3. The first row first electrode RE1, the second row first electrode RE2, the $(k-1)^{th}$ row first electrode REk−1, and the $k^{th}$ row first electrode REk may be arranged in the second direction DR2.

The plurality of second electrodes TE may include a first column second electrode TE1, a second column second electrode TE2, a $(n-1)^{th}$ column second electrode TEn−1, and a $n^{th}$ column second electrode TEn. In this case, n may be a natural number greater than 3. The first column second electrode TE1, the second column second electrode TE2, the $(n-1)^{th}$ column second electrode TEn−1, and the $n^{th}$ column second electrode TEn may be arranged in the first direction DR1.

The first line L1 may be electrically connected to a plurality of first sub-electrodes SME1. The first line L1 located in the active area SA may extend in the first direction DR1, and the first line L1 located in the peripheral area NSA may extend in the second direction DR2.

The plurality of first sub-electrodes SME1 may be electrically connected to the sensor driving unit 200C through the first line L1.

The second line L2 may be electrically connected to the plurality of second sub-electrodes SME2. The second line L2 located in the active area SA may extend in the first direction DR1, and the second line L2 located in the peripheral area NSA may extend in the second direction DR2. Within the active area SA, the second line L2 may be spaced apart from the first line L1 in the second direction DR2.

The third line L3 may be connected to one of the plurality of first sub-electrodes SME1. The third line L3 may extend in the second direction DR2. The third line L3 may be located in the first area AR1. When viewed on a plane (e.g., in a plan view), the third line L3 may not overlap the second area AR2. The third line L3 may be provided as a plurality of third lines L3, and the plurality of third lines L3 may be electrically connected to the plurality of first electrodes RE, respectively. In a plan view, the third line L3 may overlap one of the plurality of second electrodes TE.

The fourth line L4 may be connected to one of the plurality of second sub-electrodes SME2. The fourth line L4 may extend in the second direction DR2. The fourth line L4 may be located in the second area AR2. When viewed on a plane (e.g., in a plan view), the fourth line L4 may not overlap the first area AR1. The fourth line L4 may be provided as a plurality of fourth lines L4, and the plurality of fourth lines L4 may be electrically connected to the plurality of first electrodes RE, respectively. In a plan view, the fourth line L4 may overlap one of the plurality of second electrodes TE.

According to the present disclosure, the third line L3 and the fourth line L4 may extend to overlap the active area SA. For example, the third line L3 and the fourth line L4 may not be arranged in the peripheral area NSA adjacent to the active area SA in the first direction DR1. An area of the peripheral area NSA may be reduced. Thus, an area of the peripheral area NAA (see FIG. 1) may be reduced, and the electronic device ELD (see FIG. 1) in which a narrow bezel is implemented may be provided.

The first to fourth lines L1 to L4 may be electrically connected to the sensor driving unit 200C. The first to fourth lines L1 to L4 may transmit the second touch signal RS (see FIG. 6) to the sensor driving unit 200C.

According to the present disclosure, four wiring lines including the first to fourth lines L1 to L4 may be connected to one first electrode RE. A resistance of the wiring line that transmits the second touch signal RS (see FIG. 6) may be reduced. Accordingly, a bandwidth of the wiring line may increase. A range of a selectable frequency increases, and thus noise may be more easily avoided, and touch performance may be relatively improved. Accordingly, the electronic device ELD (see FIG. 1) having relatively improved sensing reliability may be provided.

The fifth line L5 may be provided as a plurality of fifth lines L5. The plurality of fifth lines L5 may be connected to the plurality of second electrodes TE, respectively. The plurality of fifth lines L5 may be arranged in the peripheral area NSA.

The plurality of fifth lines L5 may be electrically connected to the sensor driving unit 200C. The plurality of fifth lines L5 may sequentially provide the first touch signal TS (see FIG. 6) to the plurality of second electrodes TE.

The sensor driving unit 200C may acquire information on the input of the user based on a change in a mutual capacitance between the plurality of first electrodes RE and the plurality of second electrodes TE.

The change in the mutual capacitance between the plurality of second electrodes TE and the plurality of first electrodes RE may occur at a position in which the input of the user is provided. The sensor driving unit 200C may generate coordinate values for the position in which the input of the user is provided, based on the reception signals received from the first to fourth lines L1 to L4.

Figure 8:
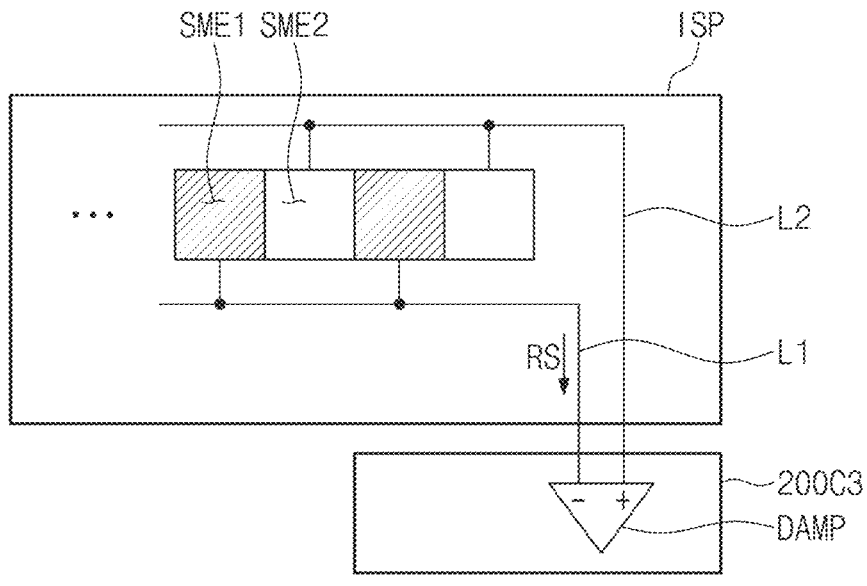
FIG. 8 is a block diagram of the sensor layer and an input detection circuit according to some embodiments of the present disclosure.

FIG. 8 is a block diagram of the sensor layer and an input detection circuit according to some embodiments of the present disclosure.

Referring to FIGS. 7 and 8, the input detecting circuit 200C3 may include a differential amplifier DAMP. The first line L1 may be electrically connected to a first terminal (e.g., a negative terminal) of the differential amplifier DAMP, and the second line L2 may be electrically connected to a second terminal (e.g., a positive terminal) thereof.

The second touch signal RS input to the first terminal is referred to as a first reception signal, and the second touch signal RS input to the second terminal is referred to as a second reception signal. The differential amplifier DAMP may generate a difference between the first reception signal and the second reception signal as an output signal. That is, the sensor driving unit 200C may acquire touch information in the active area SA using the difference between the first reception signal and the second reception signal.

Figure 9:
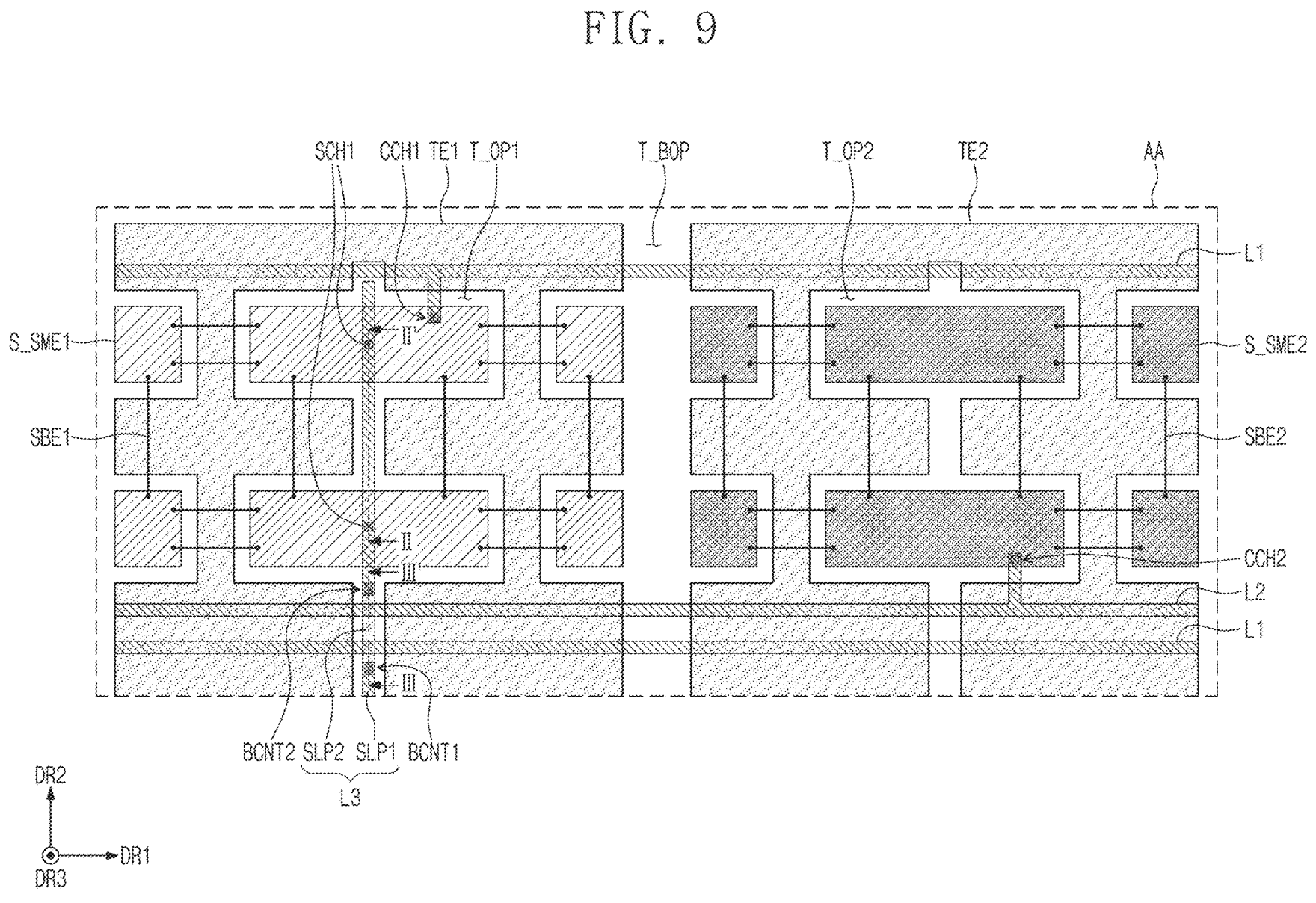
Figure 10:
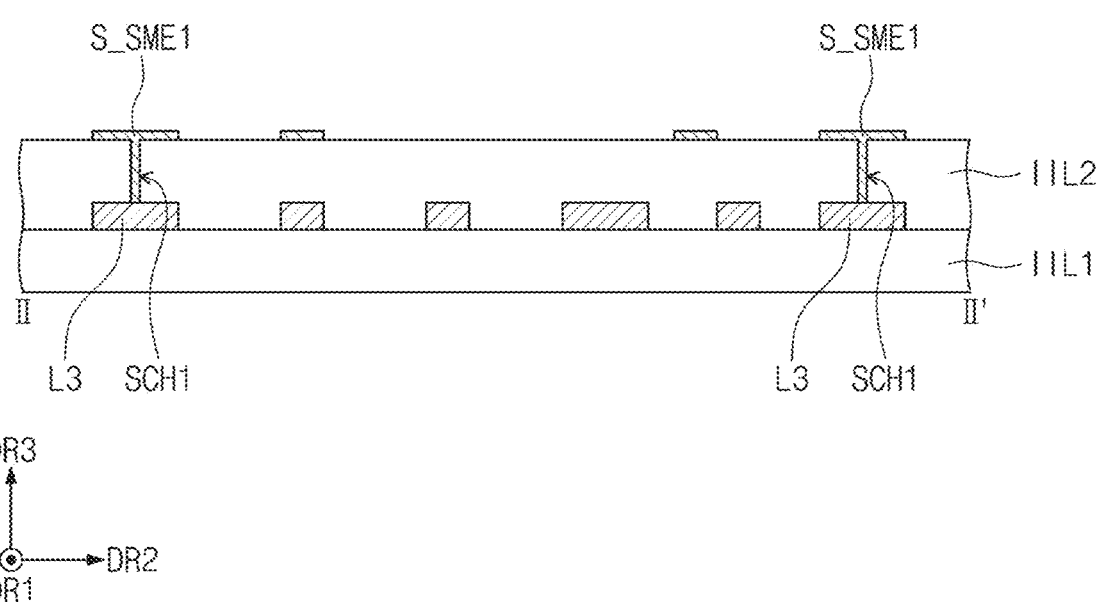
FIG. 10 is a cross-sectional view along line II-II' of FIG. 9 according to some embodiments of the present disclosure.
Figure 11:
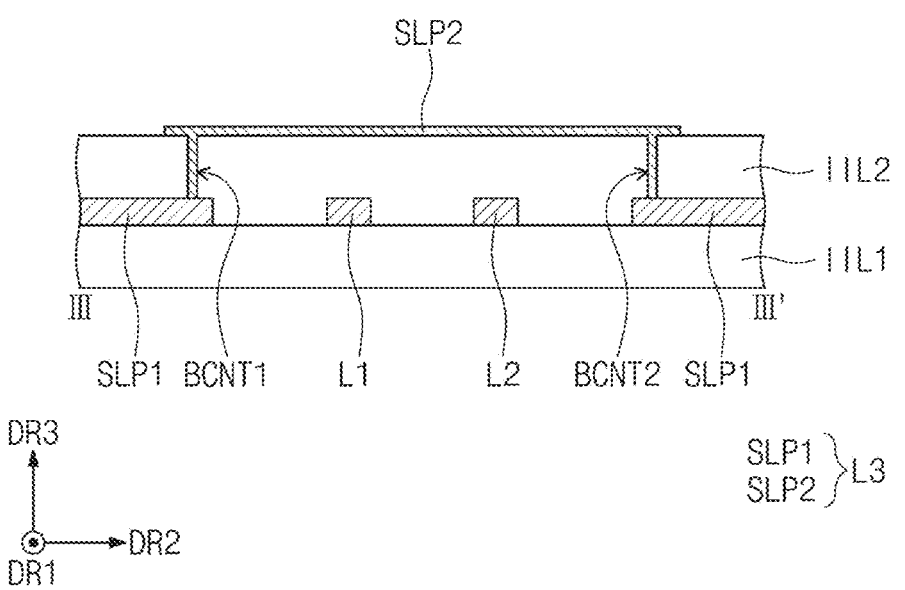
FIG. 11 is a cross-sectional view along line III-III' of FIG. 9 according to some embodiments of the present disclosure.

FIG. 9 is an enlarged plan view illustrating area AA of FIG. 7 according to some embodiments of the present disclosure, FIG. 10 is a cross-sectional view along line II-II' of FIG. 9 according to some embodiments of the present disclosure, and FIG. 11 is a cross-sectional view along line III-III' of FIG. 9 according to some embodiments of the present disclosure. In the description of FIG. 9, the components described through FIG. 7 are designated by the same reference numerals, and some repetitive description thereof may be omitted.

Referring to FIGS. 9 to 11, open parts T_OP1 and T_OP2 extending in the second direction DR2 may be defined in the plurality of second electrodes TE. FIG. 9 illustratively illustrates the first open part T_OP1 defined in the first column second electrode TE1 and the second open part T_OP2 defined in the second column second electrode TE2.

A boundary open part T_BOP may be defined between two adjacent second electrodes TE among the plurality of second electrodes TE.

A corresponding first sub-electrode SME1 among the plurality of first sub-electrodes SME1 may be arranged to correspond to the first open part T_OP1 and the boundary open part T_BOP. The plurality of first sub-electrodes SME1 may include a plurality of first segment electrodes S_SME1 and a plurality of first bridge electrodes SBE1.

Each of the plurality of first segment electrodes S_SME1 may have a quadrangular shape including two horizontal sides parallel to the first direction DR1 and two vertical sides parallel to the second direction DR2. The plurality of first segment electrodes S_SME1 may be spaced apart from each other in the first direction DR1 and the second direction DR2. The plurality of first bridge electrodes SBE1 may be connected to the plurality of first segment electrodes S_SME1.

The plurality of first sub-electrodes SME1 may be electrically connected to the first line L1 through a first contact hole CCH1. The first line L1 may extend in the first direction DR1.

A corresponding second sub-electrode SME2 among the plurality of second sub-electrodes SME2 may be arranged to correspond to the second open part T_OP2 and the boundary open part T_BOP. The plurality of second sub-electrodes SME2 may include a plurality of second segment electrodes S_SME2 and a plurality of second bridge electrodes SBE2.

Each of the plurality of second segment electrodes S_SME2 may have a quadrangular shape including two horizontal sides parallel to the first direction DR1 and two vertical sides parallel to the second direction DR2. The plurality of second segment electrodes S_SME2 may be spaced apart from each other in the first direction DR1 and the second direction DR2. The plurality of second bridge electrodes SBE2 may be connected to the plurality of second segment electrodes S_SME2.

The plurality of second sub-electrodes SME2 may be electrically connected to the second line L2 through a second contact hole CCH2. The second line L2 may extend in the first direction DR1.

The first line L1 and the second line L2 may be spaced apart from each other in the second direction DR2 with the plurality of first sub-electrodes SME1 and the plurality of second sub-electrodes SME2 interposed therebetween.

The third line L3 may be connected to one of the plurality of first sub-electrodes SME1. The third line L3 may extend in the second direction DR2. The third line L3 may be located on the first sensor insulating layer IIL1. The second sensor insulating layer IIL2 may cover the third line L3. The plurality of first segment electrodes S_SME1 may be arranged on the second sensor insulating layer IIL2. The third line L3 may be electrically connected to the plurality of first segment electrodes S_SME1 through a segment contact hole SCH1. The third line L3 and the plurality of first segment electrodes S_SME1 may have a mesh structure.

The third line L3 may include a first part SLP1 and a second part SLP2. The first part SLP1, the second part SLP2, the first line L1, and the second line L2 may be arranged on the first sensor insulating layer IIL1. The first part SLP1 may be provided as a plurality of first parts SLP1. The first line L1 and the second line L2 may be arranged between the plurality of first parts SLP1.

The second sensor insulating layer IIL2 may cover the plurality of first parts SLP1, the first line L1, and the second line L2. The second part SLP2 may be located on the second sensor insulating layer IIL2. The second part SLP2 may be electrically connected to the plurality of first parts SLP1 through a plurality of line contact holes BCNT1 and BCNT2.

When viewed on a plane (e.g., in a plan view), the second part SLP2 may overlap the first line L1 and the second line L2.

FIG. 9 illustratively illustrates the plurality of first electrodes RE and the plurality of second electrodes TE having a bar stripe shape, but the shapes of the plurality of first electrodes RE and the plurality of second electrodes TE according to some embodiments of the present disclosure are not limited thereto. For example, the plurality of first electrodes RE and the plurality of second electrodes TE may have a diamond pattern shape.

Figure 12:
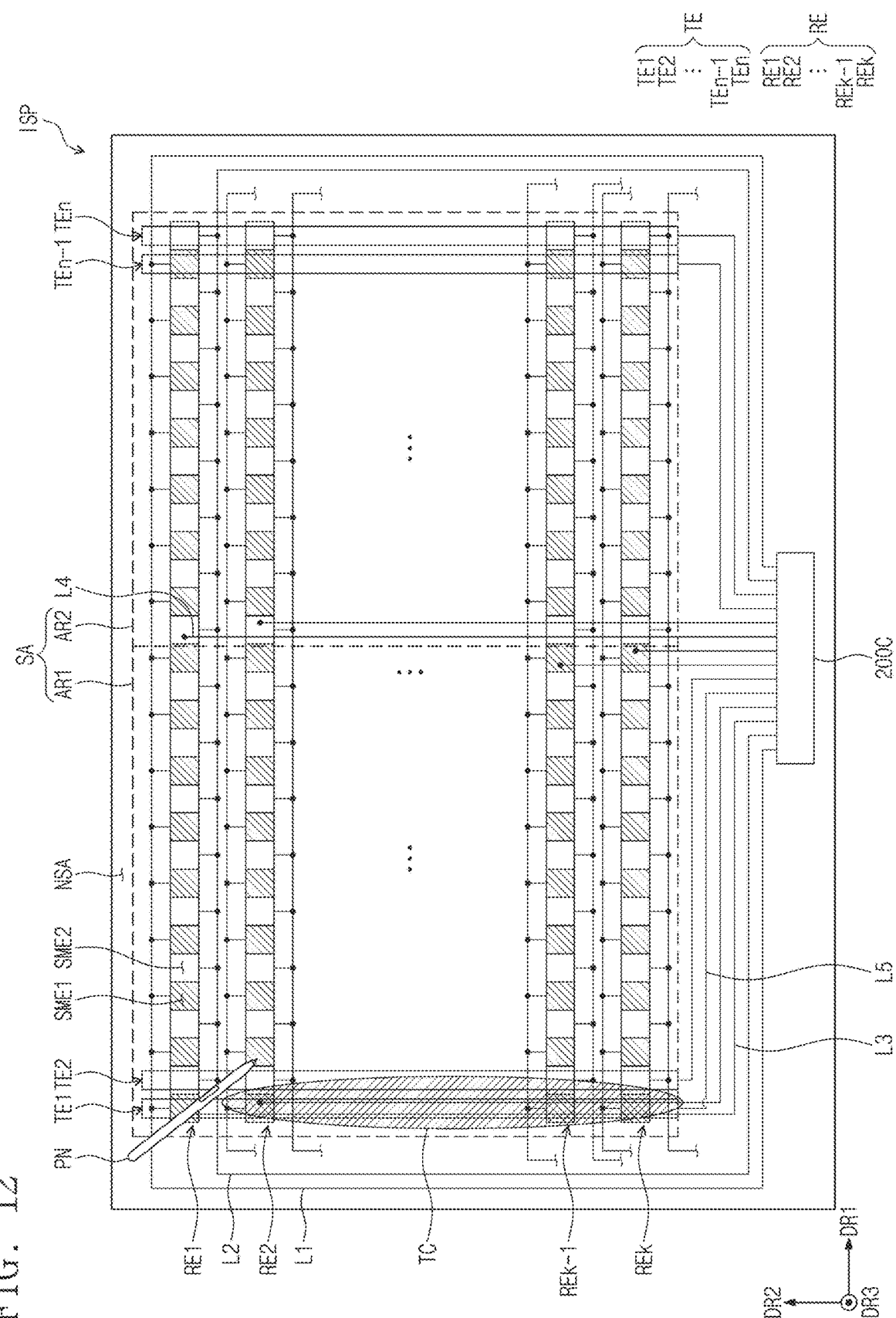
FIG. 12 is a plan view illustrating a portion of the electronic device according to some embodiments of the present disclosure.
Figure 13:
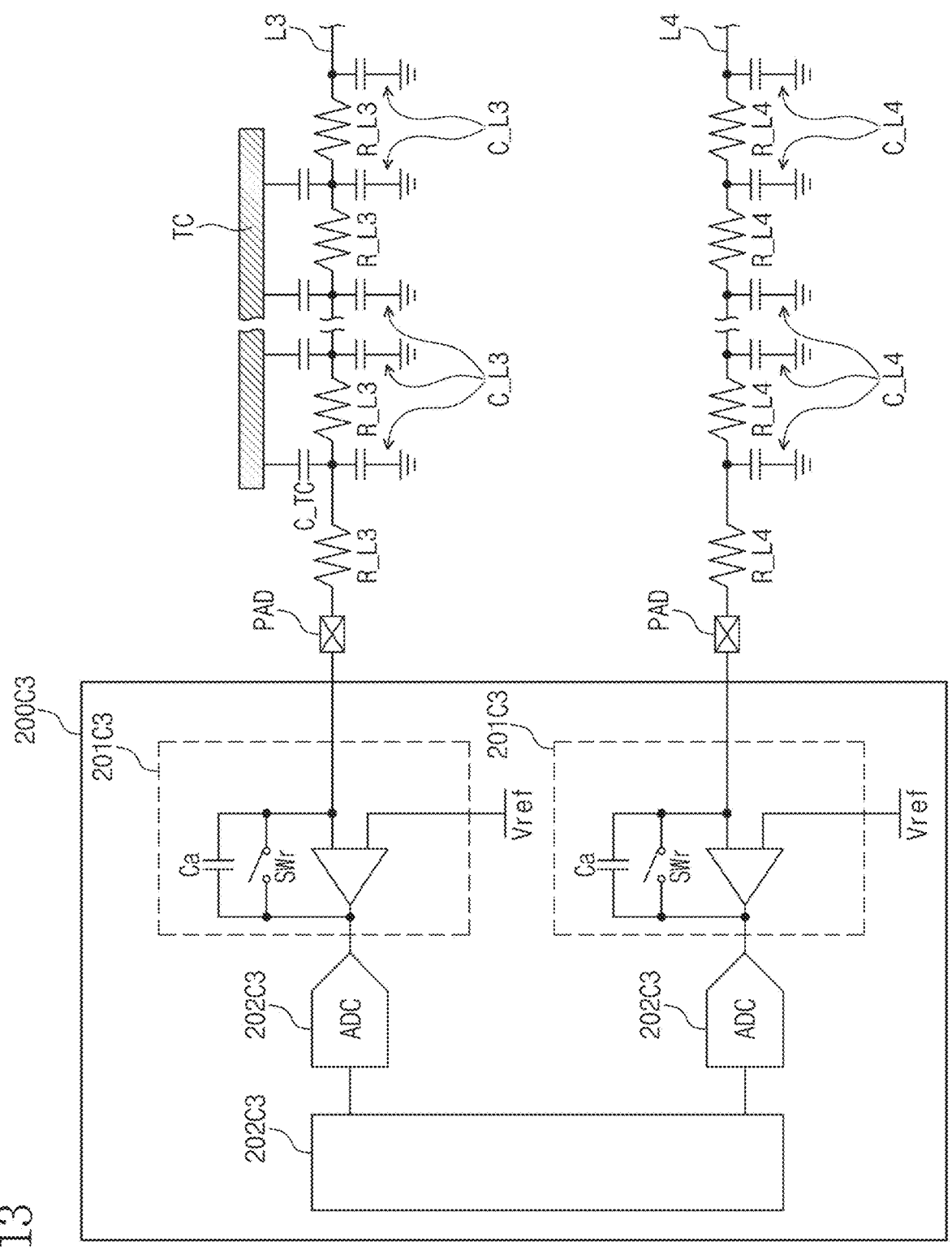
FIG. 13 is a view illustrating an operation of the electronic device according to some embodiments of the present disclosure.

FIG. 12 is a plan view illustrating a portion of the electronic device according to some embodiments of the present disclosure, and FIG. 13 is a view illustrating an operation of the electronic device according to some embodiments of the present disclosure. In the description of FIG. 12, the components described through FIG. 7 are designated by the same reference numerals, and some repetitive description thereof may be omitted.

Referring to FIGS. 12 and 13, when the user uses the pen PN, the user may use the pen PN while an arm of the user is seated on the active area SA. In this case, the arm may act as a large-area conductor TC, extend in the same direction as that of the third line L3 or the fourth line L4, and generate a coupling capacitor C_TC. For example, when the third line L3 directly connected to the first sub-electrode SME1 located on a leftmost side among the plurality of first sub-electrodes SME1 of the first row first electrode RE1 overlaps the large-area conductor TC on a plane, a capacitance of the coupling capacitor C_TC of a node corresponding to the first sub-electrode SME1 may increase.

When viewed on a plane (e.g., in a plan view), and when the large-area conductor TC overlaps the third line L3 located in the first area AR1, the large-area conductor TC may not overlap the second area AR2 spaced apart from the first area AR1 in the first direction DR1. Accordingly, the large-area conductor TC may not overlap the fourth line L4 on a plane. That is, when one of the third line L3 and the fourth line L4 overlaps the large-area conductor TC, the other one of the third line L3 and the fourth line L4 may not overlap the large-area conductor TC.

The third line L3 and the fourth line L4 connected to the plurality of first electrodes RE may be spaced apart from each other in the first direction DR1 with at least one of the plurality of first sub-electrodes SME1 or at least one of the plurality of second sub-electrodes SME2 interposed therebetween. That is, the third line L3 may be located in the first area AR1, and the fourth line L4 may be located on the second area AR2 spaced apart from the first area AR1 in the first direction DR1.

The third line L3 may be expressed as a first resistor R_L3 and a first capacitor C_L3.

When the coupling capacitor C_TC is formed on the third line L3 by the large-area conductor TC, the fourth line L4 may be spaced a distance (e.g., a set or predetermined distance) from the third line L3 in the first direction DR1 and thus may not overlap the large-area conductor TC. That is, the fourth line L4 may be spatially separated from the large-area conductor TC. Accordingly, a coupling capacitor may not be formed in the fourth line L4.

The fourth line L4 may be expressed as a second resistor R_L4 and a second capacitor C_L4.

The third line L3 and the fourth line L4 may be connected to the sensor driving unit 200C through a pad part PAD. The sensor driving unit 200C may include the input detecting circuit 200C3.

The input detecting circuit 200C3 may include a plurality of signal receiving units 201C3, a plurality of conversion circuits 202C3, and a signal processing unit 203C3.

The plurality of signal receiving units 201C3 may amplify and output the received signal. The plurality of signal receiving units 201C3 may be connected to the pad part PAD. That is, the third line L3 may be electrically connected to one of the plurality of signal receiving units 201C3, and the fourth line L4 may be electrically connected to the other one of the plurality of signal receiving units 201C3.

The plurality of signal receiving units 201C3 may output a signal corresponding to a voltage difference between the first terminal and the second terminal through an output terminal. Each of the plurality of signal receiving units 201C3 may be implemented as an analog front end (AFE) including an amplifier AMP, the capacitor "C," and a switch SW. The amplifier AMP may include an operational (OP) amplifier.

A first terminal of the amplifier AMP may be electrically connected to the pad part PAD. A reference voltage Vref may be provided to a second terminal of the amplifier AMP.

The capacitor "C" and the switch SW may be connected in parallel between the first terminal of the amplifier AMP and the output terminal.

The plurality of conversion circuits 202C3 may convert analog signals input from the plurality of signal receiving units 201C3 into digital signals. Each of the plurality of conversion circuits 202C3 may include an analog-digital converter ADC.

The signal processing unit 203C3 may process the converted signal (digital signal) from the plurality of conversion circuits 202C3 and compensate for a ghost touch based on the signal processing result.

A first sensing signal sensed by the third line L3 may include noise due to the large-area conductor TC. In this case, a second sensing signal sensed by the fourth line L4 may be a signal that does not include noise.

The signal processing unit 203C3 may calculate a difference between the first sensing signal and the second sensing signal that are converted into digital signals. The signal processing unit 203C3 may compensate for coordinates based on the difference.

The sensor driving unit 200C may compensate for the coordinates based on the difference between the first sensing signal sensed by the third line L3 and the second sensing signal sensed by the fourth line L4. Malfunction such as a ghost touch caused by the large-area conductor TC may be prevented or reduced.

According to the present disclosure, when the large-area conductor TC overlaps any one of the third line L3 and the fourth line L4 and thus the coupling capacitor C_TC is formed at a specific node, the other one of the third line L3 and the fourth line L4 may not overlap the large-area conductor TC. The signal processing unit 203C3 may receive the first sensing signal obtained by converting a signal in which noise is generated by the coupling capacitor C_TC into the digital signal and the second sensing signal obtained by converting a signal in which the noise is not generated into the digital signal. The signal processing unit 203C3 may extract only a noise signal corresponding to the noise based on the difference between the first sensing signal and the second sensing signal. The signal processing unit 203C3 may compensate for the coordinates based on the noise signal. Accordingly, the electronic device ELD (see FIG. 1) having relatively improved sensing reliability may be provided.

According to the above description, when a large-area conductor overlaps any one of the third line and the fourth line so that a coupling capacitor is formed at a specific node, the other one of the third line and the fourth line may not overlap the large-area conductor. A sensor driving unit may receive a first sensing signal obtained by converting a signal in which noise is generated by the coupling capacitor into a digital signal and a second sensing signal obtained by converting a signal in which no noise is generated into a digital signal. The sensor driving unit may extract only a noise signal corresponding to the noise based on a difference between the first sensing signal and the second sensing signal. The sensor driving unit may compensate for coordinates based on the noise signal. Thus, an electronic device having relatively improved sensing reliability may be provided.

Although the description has been made above with reference to aspects of some embodiments of the present disclosure, it may be understood that those skilled in the art or those having ordinary knowledge in the art may variously modify and change the present disclosure without departing from the spirit and technical scope of the present disclosure described in the appended claims, and their equivalents. Thus, the technical scope of the present disclosure is not limited to the detailed description of the specification, but should be defined by the appended claims, and their equivalents.

What is claimed is:

1. An electronic device comprising:
a display layer;

a sensor layer on the display layer and in which an active area is defined; and a sensor driving unit configured to drive the sensor layer, wherein a portion of the active area is defined as a first area, and the other portion of the active area is defined as a second area adjacent to the first area in a first direction, wherein the sensor layer includes:

a plurality of first electrodes, each of the plurality of first electrodes includes a plurality of first sub-electrodes and a plurality of second sub-electrodes arranged alternately in the first direction;

a plurality of second electrodes, each of the plurality of second electrodes extends in a second direction intersecting the first direction;

a first line electrically connected to the plurality of first sub-electrodes;

a second line electrically connected to the plurality of second sub-electrodes;

a third line extending in the second direction, connected to one of the plurality of first sub-electrodes, and in the first area; and a fourth line extending in the second direction, connected to one of the plurality of second sub-electrodes, and in the second area, and wherein the sensor driving unit is configured to compensate for coordinates based on a difference between a first sensing signal sensed in the third line and a second sensing signal sensed in the fourth line.

2. The electronic device of claim 1, wherein the third line and the fourth line are spaced apart from each other in the first direction with at least one of the plurality of first sub-electrodes and/or at least one of the plurality of second sub-electrodes interposed therebetween.

3. The electronic device of claim 1, wherein the sensor layer further includes a plurality of fifth lines connected to the plurality of second electrodes, respectively.

4. The electronic device of claim 1, wherein at least a portion of each of the first line and the second line extends in the first direction and is in the active area.

5. The electronic device of claim 1, wherein the plurality of first sub-electrodes and the plurality of second sub-electrodes are electrically insulated from each other.

6. The electronic device of claim 1, wherein the first line, the second line, the third line, and the fourth line are connected to the sensor driving unit.

7. The electronic device of claim 6, wherein the sensor driving unit includes a differential amplifier, the first line is electrically connected to a first terminal of the differential amplifier, and the second line is electrically connected to a second terminal of the differential amplifier.

8. The electronic device of claim 1, wherein, in a plan view, the third line and the fourth line overlap the plurality of second electrodes.

9. The electronic device of claim 1, wherein the sensor driving unit includes a sensor controlling circuit, a signal generating circuit, and an input detecting circuit, and wherein the signal generating circuit is configured to sequentially provide a driving signal to the plurality of second electrodes.

10. The electronic device of claim 9, wherein the input detecting circuit includes a plurality of signal receiving unit, each of which includes an amplifier, and wherein the third line and the fourth line are electrically connected to the plurality of signal receiving units.

11. The electronic device of claim 1, wherein the first line and the second line are arranged in the active area.

12. The electronic device of claim 1, wherein the plurality of first electrodes extends in the first direction, and the plurality of first electrodes are arranged in the second direction, wherein the plurality of second electrodes is arranged in the first direction, and wherein the plurality of first electrodes and the plurality of second electrodes are insulated from and intersect each other.

13. An electronic device comprising:

a display layer;

a sensor layer on the display layer; and a sensor driving unit configured to drive the sensor layer, wherein the sensor layer includes:

a plurality of first electrodes, each of the plurality of first electrodes includes a plurality of first sub-electrodes and a plurality of second sub-electrodes arranged alternately in a first direction;

a plurality of second electrodes, each of the plurality of second electrodes extends in a second direction intersecting the first direction;

a first line extending in the first direction and electrically connected to the plurality of first sub-electrodes;

a second line extending in the first direction and electrically connected to the plurality of second sub-electrodes;

a third line extending in the second direction and connected to one of the plurality of first sub-electrodes; and a fourth line extending in the second direction and connected to one of the plurality of second sub-electrodes, wherein the third line and the fourth line are spaced apart from each other in the first direction with at least one of the plurality of first sub-electrodes and/or at least one of the plurality of second sub-electrodes interposed therebetween, and wherein the sensor driving unit is configured to compensate for coordinates based on a difference between a first sensing signal sensed in the third line and a second sensing signal sensed in the fourth line.

14. The electronic device of claim 13, wherein an active area including a first area and a second area adjacent to the first area in the first direction is defined in the sensor layer, and wherein the third line is in the first area, and the fourth line is in the second area.

15. The electronic device of claim 14, wherein the first line and the second line are arranged in the active area.

16. The electronic device of claim 13, wherein the sensor layer further includes a plurality of fifth lines connected to the plurality of second electrodes, respectively.

17. The electronic device of claim 14, wherein at least a portion of each of the first line and the second line extends in the first direction and is in the active area.

18. The electronic device of claim 13, wherein the plurality of first sub-electrodes and the plurality of second sub-electrodes are electrically insulated from each other.

19. The electronic device of claim 13, wherein, in a plan view, the third line and the fourth line overlap the plurality of second electrodes.

20. The electronic device of claim 13, wherein the sensor driving unit includes a sensor controlling circuit, a signal generating circuit, and an input detecting circuit, wherein the input detecting circuit includes a plurality of signal receiving unit, each of which includes an amplifier, and wherein the third line and the fourth line are electrically connected to the plurality of signal receiving units.

* * * * *